J. A. ETZLER.
Truck for Moving Buildings.
No. 2,396.
Patented Dec. 23, 1841.
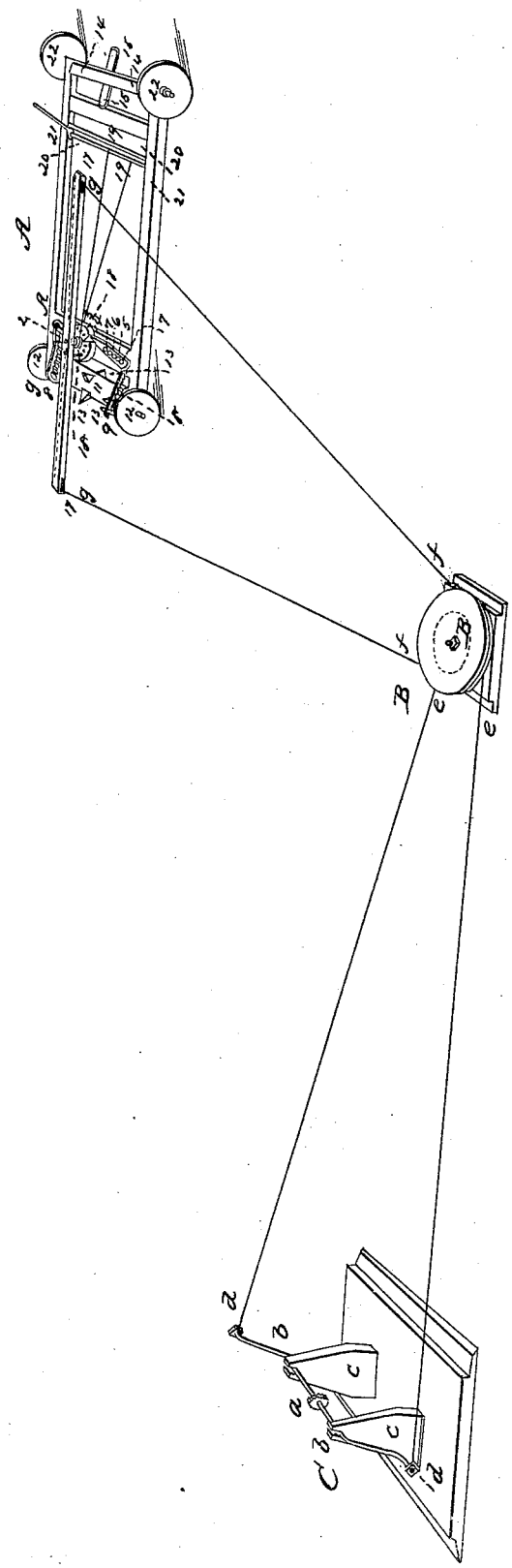

UNITED STATES PATENT OFFICE.

JOHN A. ETZLER, OF PHILADELPHIA, PENNSYLVANIA.

MODE OF PROPELLING LOCOMOTIVES BY STATIONARY POWER.

Specification of Letters Patent No. 2,396, dated December 23, 1841.

*To all whom it may concern:*

Be it known that I, JOHN ADOLPHUS ETZLER, of the city of Philadelphia and State of Pennsylvania, have invented a new and useful Mechanism for Propelling a Locomotive by a Stationary Machine, the Locomotive being named by Me the "Satelite;" and I do hereby declare that the following is a full, clear, and exact description of construction and operation of the same, reference being had to the annexed drawing, making a part of this specification and representing a perspective view.

Figure A represents the locomotive or satelite, B, a double roller in one piece, the pivot of which is fixed perpendicularly into the ground, C, the plan of some stationary machine (a water wheel, wind wheel, or a stationary steam engine for instance) which machine is to turn the wheel, D, and with it its spindle $b\ b$, on strong pillars $c\ c$, fixed permanently into the ground. The two cranks $b\ d,\ b\ d$, at this spindle, being in opposite directions, pull alternately at the two ropes, or chains $d\ e,\ d\ e$, which lie on the ground, except their both ends; the ends $e\ e$, are connected together and wound several turns around the lower part of the horizontal roller B, so as to cause, by the turn of the cranks $b\ d,\ b\ d$, an alternate vibration of the said roller; around the upper part of the same is likewise wound several turns a rope, or chain, the ends of which $f\ g,\ f\ g$, run, sweeping above the ground to the ends of a balance beam, $g,\ g$, turning horizontally on a pivot at its center to cause (by the described vibration of the roller B) a vibration of it; this vibration is to cause the forward motion of the satelite A, in any direction, in which it be steered by a person, around the roller B, within the sweeping ropes' ($f\ g,\ f\ g$) length. The length of these ropes may be from 20 to 1000 feet; when by great length found necessary, each of them may be held above ground by carts, as light as possible, at convenient intervals, moving thus in concentrical routes around the roller B (similar to the skiffs supporting a rope at a floating bridge). The chains, or ropes $d\ e,\ d\ e$, lying on the ground, may be from 1000 to 4000 feet long; so that the utmost distance between the stationary machine and the satelite may be 4000 + 1000 feet, or about 1 mile. The area within the compass of the greatest distance between the stationary and locomotive machines I call (for brevity's sake) a circuit; and the area within the compass of the greatest extent of the sweeping ropes $f\ g,\ f\ g$, I call an orbit. The orbits may be shifted from time to time, by shifting the roller B (the center of the orbit) and its connecting chains or ropes. The area of a circuit thus may consist of many orbits.

For the purpose to enable the person, who directs the satelite, to shorten and lengthen the sweeping ropes $f\ g,\ f\ g$, as the alteration of the distance between the satelite and the roller B may require from time to time while the satelite proceeds, the ropes $f\ g,\ f\ g$, pass at the ends of the balance beam, $g\ g$, through the holes around rollers 17, 17, indicated by a dotted circle, thence to, and around a roller 18, 18, for each rope one apart, turning at the same pivot, 2, of the balance beam $g\ g$; this part of the rope is indicated by the dotted lines 17, 2—17, 2; thence each to a windlass 19, 19, the continuations of the ropes are indicated by the lines 2, 19—2, 19; the windlasses turning in the oblong frame of the satelite 10, 14, 14, which turning is effected by a hand at a hand spike at 20, 20; ratchet wheels 21, 21, with a stopper, in the usual way, will prevent the turning back of the windlass; if said ropes are to be lengthened, the stopper is to be lifted by the hand, to let the rope wind off; in the contrary case, it is wound on.

To enable the conductor of the satelite, to steer it in any direction at will, consequently in any angle with its sweeping ropes $f\ g,\ f\ g$, and keep the balance beam $g\ g$, still in its proper position in regard to its ropes, that is, nearly at right angles with them, said balance beam may be turned on its pivot in any position, and, in it, connected with a wheel, 3, underneath, by a pin, 16, passing through the balance beam and any of the vertical holes at the periphery of the wheel 3, which turns around the same pivot (2) with the balance beam $g\ g$.

To cause by the described vibration of the balance beam $g\ g$, a forward motion of the satelite, the wheel, 3, described has at each side (of the satelite) two cogs, or an incision answering the same purpose, which embrace the end of a smaller balance beam 4, 5; to move (by its vibration) the same vibratorily in horizontal direction on its pivot, 6—9, 10, 9, 10, propelling rods are connected with the outer end of it. The fore ends of these propelling rods, are at their lower sides provided with ratchet teeth fitting in the teeth of vertical ratchet wheels 8, 8, underneath, on which the former lie with their own weight, when operating, their fore ends being kept in their position by a fork at 9, 9. The teeth are so directed, that the forward motion only of the propelling rods pushes them against those of the ratchet wheels, thus causing alternately a part of the revolution at each side. By this contrivance the cylinder, 11, turns on its axis, which with the cylinder and said ratchet wheels together forms one entire piece, and the cylinder revolves, though the connecting ropes $f\ g, f\ g$, should occasionally be more or less tended, and in consequence produce shorter or longer pulls at the ends of the balance beam $g\ g$. Whenever the motion of the cylinder is to cease, without stopping the vibratory motion of the balance beam $g\ g$, the fore ends of the propelling rods 9, 10, 9, 10, are to be lifted. To cause by the above described contrivance a mere locomotion, the said cylinder 11, may be provided at each of its outer ends with a common wagon wheel 12, 12, at its axis fastened, while the hind end of the satelite is carried on two wagon wheels 22, 22, in the usual mode.

When an operation in the ground, or any locomotion of the satelite, with overcoming a greater resistance, is to be effected, the aforesaid wagon wheels 12, 12, are to be removed, when the cylinder will roll on the ground pressing its teeth 13, 13, 13 . . . into it, and taking thus a firm hold in the ground so as to drag with it whatever be attached to it. The greater the resistance to be overcome, the more weight is to be put on the fore part of the satelite to press teeth 13, 13 . . . deeper in the ground.

To steer the satelite, an axle tree 14, 14, at the hind end of the satelite, has through a broad aperture passing a bar 15, 15, which turning at its center on a pivot, can be brought into a position at right angles with the axle tree, by the guide, who inclining its foremost end against the ground, causes it to stick in it; the axle tree, in consequence, will rise with the hind part of the satelite, it being balanced, until the bar 15. 15, comes into a vertical position, when the guide gives to its upper end a push, which makes the bar incline sidewise and throw over to that side the hind part of the satelite, which operation may be repeated until the direction desired is obtained.

To increase the power, with a proportionately slower motion, and vice versa, the pivot 6, of the smaller balance beams 4, 5, may be shifted into any of the holes 7, 7 . . . to which are corresponding holes underneath in the cross beam.

To prevent the satelite from being turned by the alternate pulls of its connecting ropes, the hind wheels 22, 22, may have sharp felleys. But its own weight and the tools attached to it for operating in the ground, may be made in all cases sufficient to that effect.

The applications of this invention embrace all sorts of temporarily stationary and locomotive machines. A few chief objects may here be only named for instance, such as plowing, harrowing, pulverizing and leveling the ground, scooping, excavating, elevating earth, sinking large wells and mines, forming reservoirs, sowing, mowing, gathering and removing crops; sawing and cutting wood and stone on the spot where found, battering and removing rocks by a hammer, tearing down trees, eradicating stumps and roots, lifting heavy weights with a crane—all operations, if connected with simultaneous locomotion, are effected in substituting the satelite to animals and if without simultaneous locomotion, in substituting the satelite to any stationary machine in use for the respective purpose—the rotatory and the vibratory motion described affording the kind of motive power wanted.

What I claim as my invention and desire to secure by Letters Patent, is—

1. The method of communicating motion to a carriage from a stationary power by the combination of the cranks $b\ d, b\ d$, chains or ropes $d, e, d, e, f, g, f, g$, horizontal roller B, and the balance beam and appendages, substantially as herein described.

2. I also claim the arrangement for shifting the direction of the balance beam as the locomotive advances and turns as described.

3. And finally I claim the method of shifting the direction of the locomotive by means of the shifting bar 15, jointed to the axle tree 14, as herein described.

JOHN ADOLPHUS ETZLER.

Witnesses:
 THOS. BARLOW ZANTZUYK,
 WILLIAM OSBORN.